US006692814B2

United States Patent
Kasuga et al.

(10) Patent No.: US 6,692,814 B2
(45) Date of Patent: Feb. 17, 2004

(54) RETAINING PIECE STRUCTURE

(75) Inventors: Shinichi Kasuga, Gunma (JP); Ryoichi Sato, Gunma (JP); Hiroki Yamaguchi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/317,083

(22) Filed: Dec. 12, 2002

(65) Prior Publication Data

US 2003/0087062 A1 May 8, 2003

Related U.S. Application Data

(62) Division of application No. 09/756,180, filed on Jan. 9, 2001, now Pat. No. 6,565,947.

(30) Foreign Application Priority Data

Jan. 11, 2000 (JP) .................................... P. 2000-002721
Jan. 13, 2000 (JP) .................................... P. 2000-004311

(51) Int. Cl.⁷ ............................ B32B 3/00; F16C 19/20; F16C 19/40
(52) U.S. Cl. ..................... 428/172; 428/192; 384/520; 384/524; 384/551; 492/15
(58) Field of Search .......................... 428/33, 53, 172, 428/192, 174; 384/45, 51, 620, 623, 520, 521, 522, 523, 551, 524; 492/15, 21, 39, 40, 60

(56) References Cited

U.S. PATENT DOCUMENTS 5,149,208 A * 9/1992 Zornes ........................ 384/551
5,927,858 A * 7/1999 Agari ........................... 384/45
6,352,367 B1 * 3/2002 Konomoto et al. ........... 384/45

FOREIGN PATENT DOCUMENTS

JP 2000-120825 4/2000
JP 2000-213538 8/2000

* cited by examiner

Primary Examiner—Donald J. Loney
(74) Attorney, Agent, or Firm—Sughrue Mion, PLLC

(57) ABSTRACT

In a retaining piece interposed between the adjacent rolling balls, a concave surface of each of both side surfaces of the retaining piece where it contacts with the spherical surfaces of the balls is configured to partly contact with the spherical surface of the ball. The concave surface includes a linear contact portion to be in contact with the ball and an approximate curved surface having the radius of curvature approximate to that of the ball, which is located on the inner side of the linear contact portion. In addition, recesses which are joined to the gate portion and the ejector pin in a molding process are formed in the concave surfaces. A recess is formed at the joining portion or near a parting line. Fins formed in the molding process are capable to be put into the recess.

2 Claims, 6 Drawing Sheets

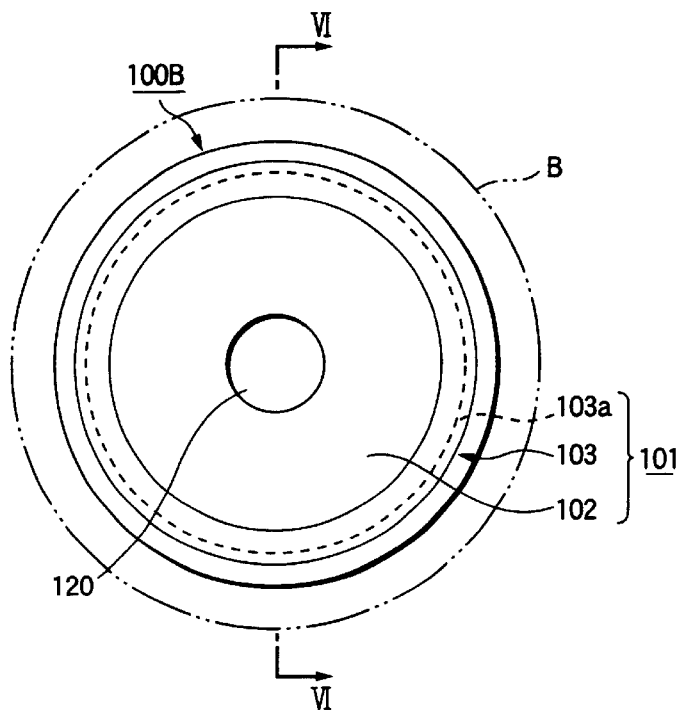
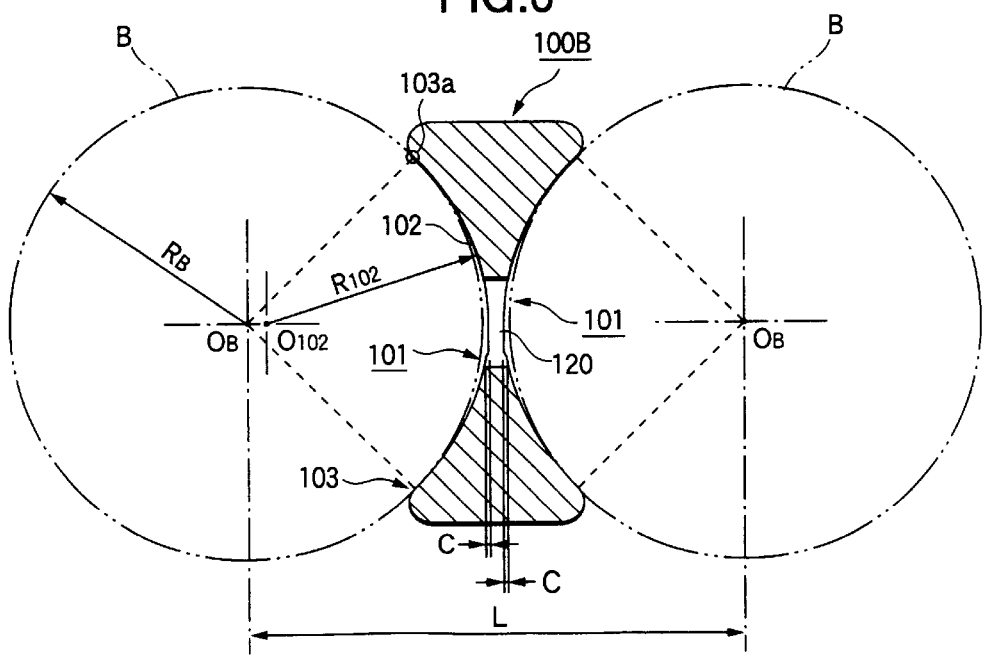

RETAINING PIECE STRUCTURE

This is a divisional of application Ser. No. 09/756,180 filed Jan. 9, 2001 now U.S. Pat. No. 6,565,947; the disclosure of which is incorporated herein by reference.

BACKGROUND OF THE INVENTION

1. Field of the Invention

The present invention relates to a linear motion device which causes a linear motion by the utilization of the rolling of rolling elements, such as steel balls or ceramic balls. More particularly, the invention relates to improvements of a structure of the retaining pieces interposed between the adjacent rolling elements and a linear motion device using the retaining pieces thus structured.

2. Description of the Related Art

Examples of the known linear motion device utilizing the rolling of a number of rolling elements are a linear motion guide bearing such as a linear guide or a linear ball bearing, and various types of screws having balls. Those linear motion devices are widely used as important mechanical components in many industrial machines.

As an example of this type of the device, a linear guide 10 is illustrated in plan, partly cut out, in FIG. 9. As shown, the linear guide 10 generally includes a guide rail 1, which axially extends, and a slider 2, shaped like U in cross section, which straddles the guide rail. Ball rolling grooves 3, while axially extending, are respectively formed in both side surfaces of the guide rail 1. A ball rolling groove 5, which faces a ball rolling groove 3, is formed in the inner wall of each of both side portions of a slider body 2A of a slider 2. A number of steel balls B as rolling elements are put between those opposed ball rolling grooves 3 and 5. The slider 2 is axially movable on and along the guide rail 1, with the assistance of the rolling of the steel balls B. With the movement of the slider, the steel balls B, which are interposed between the guide rail 1 and the slider 2, will move to the end of the slider body 2A of the slider 2. To continuously move the slider 2 in the axial direction, an endless circulation of those steel balls B is needed.

A linear through-hole 6 is axially formed in each side portion of the slider body 2A. The linear through-hole serves as a ball return path. End caps 7 are applied to both ends of the slider body 2A. Ball circulation tracks 8, semicircular in cross section, are formed in the caps so as to interconnect a path defined by the ball rolling grooves 3 and 5 and the linear through-hole 6, whereby a ball endless circulation track 9 is formed.

A ball screw mechanism 20 is perspectively illustrated, partly cut out, in FIG. 10. As shown, a ball nut 12 is fit to an axially extending threaded shaft 11. A thread groove 11a, semicircular in cross section, is formed in the outer peripheral surface of the threaded shaft 11. A thread groove 12a, semicircular in cross section, is formed in the inner peripheral surface of the ball nut 12. The thread groove 11a of the threaded shaft 11 is confronted with the semicircular thread groove 12a of the ball nut 12. A number of steel balls B as rolling elements are put in a path defined by those thread grooves 11a and 12a. The threaded shaft 11 and the ball nut 12 are relatively moved in the axial direction with the assistance of the rolling of the steel balls (for example, the threaded shaft 11 is axially rotated while the ball nut 12 rectilinearly moves.). With the relative movement, the steel balls B move while rolling in and along the spiral track defined by the thread grooves 11a and 12a. To continuously move the ball nut 12, an endless circulation of those steel balls B is needed.

A couple of circulation holes 17 are formed in the thickness of the ball nut 12 in a state that it straddles the threaded shaft 11 and is opened to the outside of the nut. The circulation holes 17 communicatively connect to the spiral track while extending in the tangential direction with respect to the path. A ball circulating track 18 is formed by coupling the circulation holes 17 by means of a ball tube 14A shaped like U (two ball circulating tracks 18 are used in the illustrated instance). After the steel balls B move a distance of, for example, 1.5 turn within the spiral track, those are introduced into the ball circulating track 18 and move in an endless circulating manner.

Smoother and more stable operations of the steel balls B as rolling elements, low noise and the like are required for the linear motion device. To meet the requirements, a measurement has been employed in which a spacer ball of the reduced diameter is interposed between the adjacent load balls. Where the measure is employed, the following problem arises anew, however. As the result of the interposing of the spacer ball, a span between the load balls is elongated. As an inevitable consequence, the load capacity and rigidity of the linear motion device are reduced. Therefore, a following approach is experimentally made. Retaining pieces (also called separators) 30 are each interposed between the adjacent steel balls B as shown in FIG. 11. By the retaining pieces 30 thus arranged, gaps in the row of the steel balls in their moving direction are eliminated and compression force is forcibly applied to the steel balls B, whereby the operability and the noise characteristic are improved.

To further improve the operability and noise characteristic, various proposals have been made which are constructed giving attention to the shape of the retaining, piece 30 and the gaps present between the adjacent steel balls B and the retaining pieces 30.

The applicant of the present patent application proposed the following piece structures in Japanese Patent Unexamined Publication No. 2000-120825:

1) In the retaining piece structure, a retaining piece has two recessed surfaces respectively facing to the balls. Each recessed surface is shaped such that it contacts with the steel ball at its outer edge or near outer edge. With this novel and unique technical feature, the low noise generation is achieved, and the operability is improved by maximizing the overlapping width of the retaining piece over which it contacts with the steel ball. Further, the spans between the steel balls are controlled at high precision.

2) In another structure, a retaining piece has recessed surfaces so shaped as to be in liner contact with the balls. This retaining piece structure also achieves the low noise generation. Further, the operability is improved since sliding resistance between the retaining pieces and the balls is small, and stable ball holding by the retaining pieces is secured.

The applicant of the present patent application proposed novel and unique retaining piece structure in Japanese Patent Unexamined Publication No. 2000-213538. In the retaining piece structure, proper gaps are provided in one ball row containing retaining pieces and balls, whereby the low noise generation and the improvement of the operability are achieved (those effects are high in level when the gap dimension is selected to be within 2⅔ to 63⅔ of the ball diameter.)

The retaining niece structure of Japanese Patent Unexamined Publication No. 2000-120825 is capable of satisfying the proper gap dimension described in Japanese Patent Unexamined Publication No. 2000-213538 if it is used in normal condition and the gap dimension is within a proper range of dimension values. Under a large pre-load and a large moment load, a load acting on the retaining piece (a pressing force of the ball against the recessed surface of the retaining piece) is large. As a result, the retaining piece is deformed, the ball-to-ball span is reduced, and the ball row will possibly lose its proper gap dimension.

When the linear motion device is used for a long time under hard conditions, the recessed surfaces of the retaining pieces will be worn and/or yielded. In this case, the ball-to-ball span is considerably reduced, the proper gap dimension is lost, and the revolution of the ball is abnormal. This problem remains unsolved.

An explanatory figure of the above structures is FIG. 8. In this figure, by the retaining pieces 30A arranged, gaps in the row of the steel balls in their moving direction are eliminated and compression force is forcibly applied so the steel balls 3, whereby the operability and the noise characteristic are improved. Further, the span between the adjacent balls is reduced to minimize the reduction of the load capacity and rigidity of the linear motion device.

Also, in the aforementioned Japanese Patent Publications, the retaining piece 30A as the cylindrical member having the concave surfaces on both sides to be in contact with the balls B, B is made of synthetic resin and manufactured by injection molding as shown in FIG. 8. In this Figure, a gate portion G is provided on the outer peripheral surface thereof.

In the case of the retaining pieces 30A manufactured in a state that the gate portion G is provided on the outer peripheral surface thereof, the reduction of the load capacity and rigidity may be lessened by reducing the thickness of the retaining pieces 30A as small as possible. However, a gate-cutting step is inevitably needed after the injection molding process. Therefore, the cost to manufacture is increased by its cost. Further, the gate remainder after the gate cutting and the parting line of the molded product take the form of fins. As a result, the operability and the noise characteristic or she retaining pieces will possibly be deteriorated.

SUMMARY OF THE INVENTION

The preset invention has been made to solve the above problem, and has an first object to provide a retaining piece structure and a linear motion device using the retaining pieces thus structured in which even when a load acting on the retaining pieces is excessive and the recessed surfaces of the retaining pieces are worn and/or yielded, a variation of the ball-to-ball span is minimized, and hence excellent improvements of the operability and the noise characteristic are maintained for a long time even under various use conditions.

In addition, the present invention has been made to solve the above problems and has a second object to provide a structure of a retaining piece and a linear motion device using the retaining pieces thus structured in which improvement is made about the gate position and the like in injection molding retaining pieces, whereby the operability and the noise characteristic are reliably improved at low cost.

To achieve the above first object, there is provided a structure of a retaining piece which is interposed each between the adjacent balls of a row of rolling balls, and concave surfaces of both side surfaces of said retaining piece as viewed in the axial direction are in contact with the spherical surfaces of the calls. The retaining piece structure is characterized in that each said concave surface is configured such that as a pressing force acting on said concave surfaces increases, each said concave surface increases a contact area thereof with the ball.

According to a second aspect of the invention, there is provided a structure of a retaining piece which is interposed between the adjacent calls of a row of rolling balls, and concave surfaces of both side surfaces of the retaining piece as viewed in the axial direction are in contact with the spherical surfaces of the balls. The retaining piece structure is characterized in that each the concave surface is configured such that as the wearing and/or yielding of the contact portion of the concave surface with the ball progress, the concave surface increases a contact area thereof with the ball.

According to a third aspect of the invention, there is provided a structure of a retaining piece which is interposed between the adjacent balls of a row of rolling balls, and concave surfaces of both side surfaces of the retaining piece as viewed in the axial direction are in contact with the spherical surfaces of the balls. The retaining piece structure is characterized in that each the concave surface includes a linear contact portion to be in contact with the ball, which is located close to the outer peripheral edge thereof, and an approximate curved surface having the radius of curvature approximate to that of the ball, which is located on the inner side of the linear contact portion (claim 3).

The invention also provides a linear motion device provided with retaining pieces each having any of the retaining piece structures described above.

In the retaining piece structure of the invention, each of the concave structure of the retaining piece a linear contact portion to be in contact with the ball, and an approximate curved surface having the radius of curvature approximate to that of the ball. Normally, the ball linearly contacts with the retaining piece, while the approximate curved surface having the radius of curvature approximate to that of the ball does not contact with the ball with a slight gap therebetween.

When a load acting on the retaining piece increases to excess a load value, or when the concave surface of the retaining piece is worn and/or yielded, a preset gap quantity between the retaining piece and the ball is reduced, and a span between the adjacent balls is reduced. Then, the ball starts to contact with the approximate curved surface having the radius of curvature approximate to that of the ball in the concave surface of the retaining piece. As a result, a contact area or the ball 3 with the approximate curved surface 102 increases, and no further reduction of the span L progresses.

Next, to achieve the above second object, a fourth to ninth aspect or the invention are provided as follows. According to a fourth aspect of the invention, there is provided a structure of a retaining piece which is interposed between the adjacent balls of a row rolling balls, and concave surfaces of both side surfaces of the retaining piece as viewed in the axial direction are in contact with the spherical portion used in a process of molding retaining pieces is provided in the concave surface.

According to a fifth aspect of the invention, in the retaining piece structure of the fourth aspect of the invention, a recess is provided at a joining portion joined to the gate portion used in the process of molding the retaining pieces.

According to a sixth aspect of the invention, there is provided a structure of a retaining piece which is interposed between the adjacent balls of a row of rolling balls, and concave surfaces of both side surfaces of the retaining piece as viewed in the axial direction are in contact with the spherical surfaces of the balls, the improvement comprising a holder portion which holds an ejector pin used in a process of molding the retaining pieces is positioned in the concave surface.

According to a seventh aspect of the invention, in the retaining piece structure, a recess is provided at a joining portion joined to the ejector pin used in the process of molding the retaining pieces.

According to an eighth aspect of the invention, there is provided a structure of a retaining piece which is interposed between the adjacent balls of a row of rolling balls, and concave surfaces of both side surfaces of the retaining piece as viewed in the axial direction are in contact with the spherical surfaces of the balls, the improvement comprising a parting line used in process of molding the retaining pieces is set on the outer peripheral surface of the retaining piece, and a recess or a tapered portion is provided near the parting line on the outer peripheral surface.

According to a ninth aspect of the invention, there is provided a linear motion device provided with retaining pieces each having any of the retaining piece structures described above.

In the retaining piece structure of the invention, the gate portion and the ejector pin, which are used in the process of molding the retaining pieces, are provided in the concave surfaces of both side surfaces of the retaining piece as viewed in the axial direction. Thus, in the mold separation step after the molding process, the retaining piece is automatically separated from the gate. Therefore, the gate cutting process, which is essential to the conventional technique, is eliminated, and this leads to cost reduction.

A recess is provided at a joining portion of the concave surface to the gate portion or the ejector pin position or near the parting line. In addition, fins and the like formed in the molding process are out in the recess. According, it never happens that when the retailing pieces are incorporated into the linear motion device, the fins or the like come in contact with the bails of the linear motion device and the inside and outside guide members, to thereby deteriorate the inside and outside guide members, to thereby deteriorate the operability and the noise characteristic.

BRIEF DESCRIPTION OF THE DRAWINGS

FIG. 5 is a front view showing a third embodiment of a retaining piece structure according to the present invention;

FIG. 6 is a cross sectional view taken line VI—VI in FIG. 5;

DETAILED DESCRIPTION OF THE PREFERED EMBODIMENT

The preferred embodiments of the present invention will be described with reference to the accompanying drawings.

Figure 1:
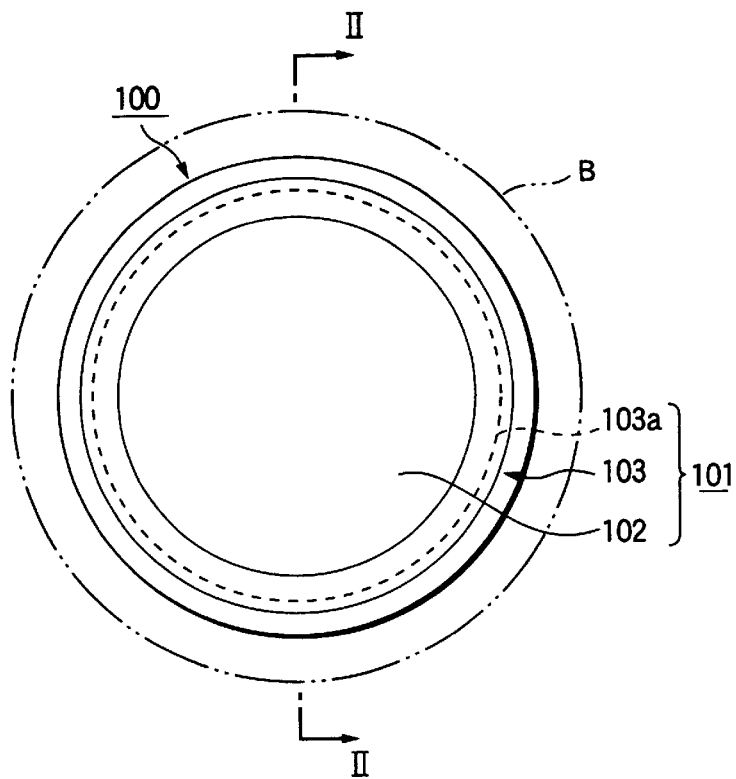
FIG. 1 is a front view showing an embodiment of a retaining piece structure according to the present invention.
Figure 2:
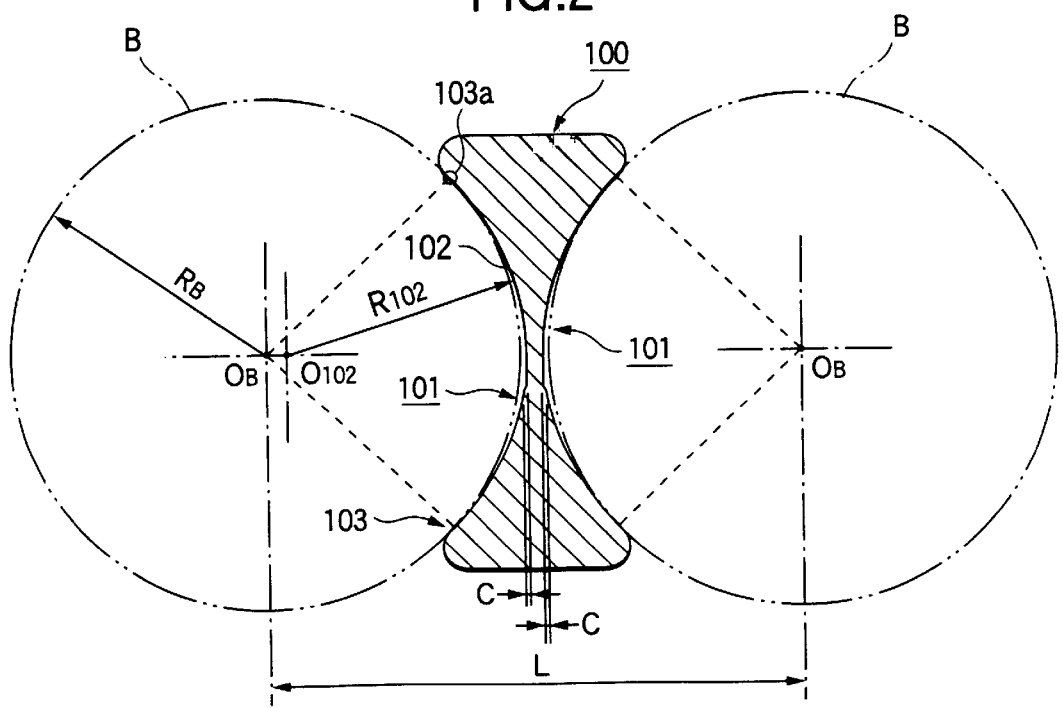
FIG. 2 is a cross sectional view taken line II—II in FIG. 1.
Figure 9:
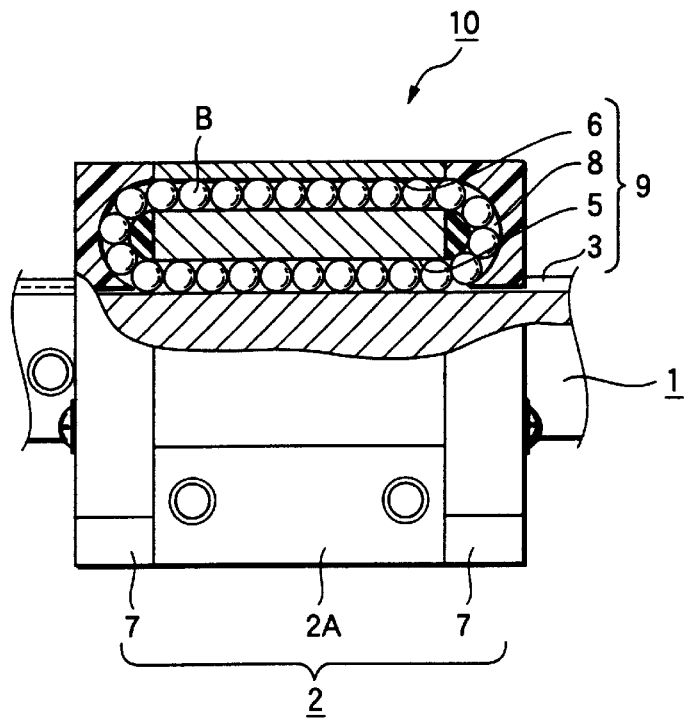
FIG. 9 is a perspective view, partly cut out, showing a key portion of a linear guide as a linear motion device into which the retaining piece structure of the invention may be applied.
Figure 10:
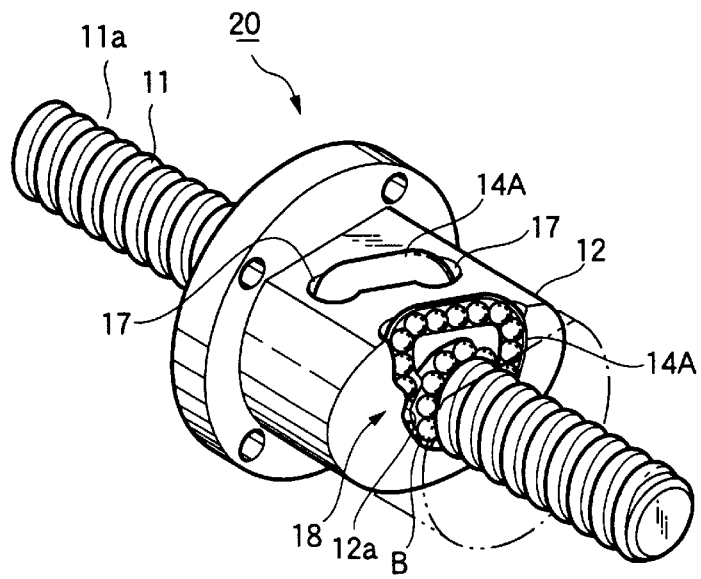
FIG. 10 is a perspective view, partly cut out, showing a key portion of a ball screw mechanism as a linear motion device into which the retaining piece structure of the invention may be applied.
Figure 11:
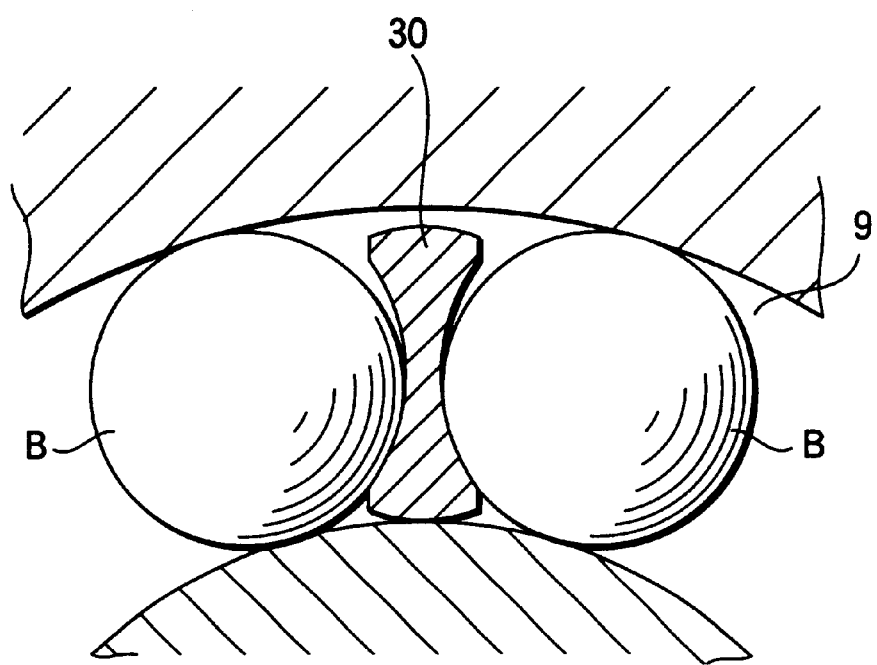
FIG. 11 is a diagram showing a model of a retaining piece structure related to the invention.

FIG. 1 is a front view showing an embodiment of a retaining piece structure according to the present invention. FIG. 2 is a cross sectional view taken line II—II in FIG. 1. Construction description about the invention will first be given. A retaining piece 100 is interposed between the balls B in the ball endless circulation track 9 of the linear guide as the linear motion device (FIG. 9) or the ball circulation track 18 of the ball screw (FIG. 10). The construction of the linear motion device per se is the same as of the already described one except the retaining pieces 100. Hence, no further description of it will be given here.

The retaining piece 100 is made of a material excellent in the injection molding and wear proof, such as 66 nylon or whiskers-contained 66 nylon. It takes the form of a short cylindrical member smaller in diameter than the steel ball B. Both sides of the retaining piece 100 are inward curved at the radius of curvature, which is approximate to the radius RB of the steel ball B, into concave surfaces 101. The details of the concave surfaces 101 will be described hereunder.

A central portion of the concave surface 101 is an approximate curved surface (spherical surface) 102 whose radius of curvature is approximate to the curvature radius RB of the ball B. The concave surface 101 further includes a ring-like linear contact portion 103 where it linearly contacts with the ball B. The linear contact portion 103 is located closer to the outer peripheral edge of the concave surface 101, while surrounding the approximate curved surface 102. A circular broken line depicted within the linear contact portion 103 indicates a phantom linear contact line 103a where it contacts with the ball B. A position of the phantom linear contact line is displaced within a width range of the linear contact portion 103 in accordance with a variation of a pressing force of the ball B. In other words, the concave surface 101 is configured such that so long as a variation of the pressing force of the ball B is within a predetermined range of force values, its linear contact with the ball B is maintained, and when the pressing force of the ball B increases to be in excess of a force value within the predetermined range, the ball B begins to contact with the outer peripheral portion of the approximate curved surface 102 and its contact area with the ball B gradually increases.

An operation of the retaining piece 100 thus structured will be described.

In a normal state that the pressing force of the ball B is not large, the ball B linearly contacts with a part of the linear contact portion 103, and a small gap of about 30 to 50 μm, as shown in FIG. 2, is present between the approximate curved surface 102 and the outer surface of the ball B. When comparing with the conventional retaining piece structure in which the concave surface entirely contacts with the ball B from the first, sliding resistance between the retaining piece and the ball is small, and hence low noise generation and high operability are obtained.

When a load acting on the retaining piece 100 increases to excess a load value within which the linear contact is maintained, or when the concave surface 101 of the retaining piece is worn and/or yielded as the result of long time use, a preset gap quantity C between the retaining piece 100 and the ball is reduced, and a span L between the adjacent balls is reduced. Accordingly, the ball B starts to contact with the approximate curved surface 102 of the concave surface or the retaining piece, a contact area of the ball B with the approximate curved surface 102 increases, and no further reduction of the span L progresses. Thus, a variation of the ball-to-ball span L is reduced while a proper contact area is maintained. Therefore, the good operability and the improved noise characteristics are kept.

In consideration of a quantity of the overlapping portion of the ball B and the like, in the embodiment, the concave surface 101 is configured so as to be most suitable for the operability improvement: "The linear contact portion 103 is located closer to the outer peripheral edge of the concave surface 101 and the approximate curved surface 102 is located in the central portion of the same." If required, the concave surface 101 may be configured as follows: "The linear contact portion 103 is located in the central portion of the concave surface 101 and the approximate curved surface 102 is located close to the outer peripheral edge." In the latter case, the overlapping portion of the ball B is reduced, so that the operability is somewhat inferior to that of the former.

With regard to the increase of the contact area, the concave surface is not limited to the one configured such that the contact area abruptly increases as in the embodiment, but it may be a concave surface configured such that the contact area gradually increases, that is, a curved surface whose curvature radius is approximate to that of the ball may be reshaped into a curved surface whose curvature radius is somewhat smaller than that of the ball.

The concave surface may be configured so as to be the most suitable for use conditions in consideration of the balance of the operability (the better it is, the smaller the contact area is) and the durability (it is better when the ball-to-ball span L is invariable and as the contact area increases).

Figure 3:
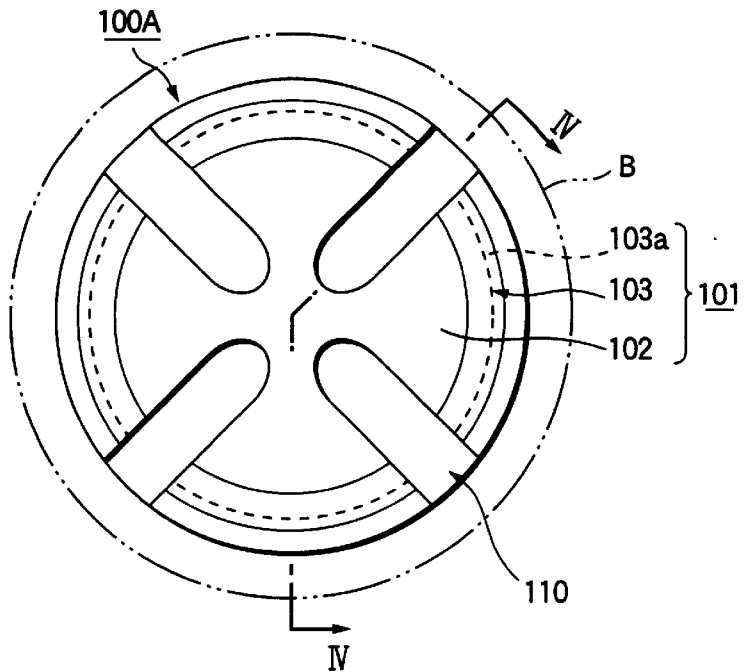
FIG. 3 is a front view showing a second embodiment of a retaining piece structure according to the present invention.
Figure 4:
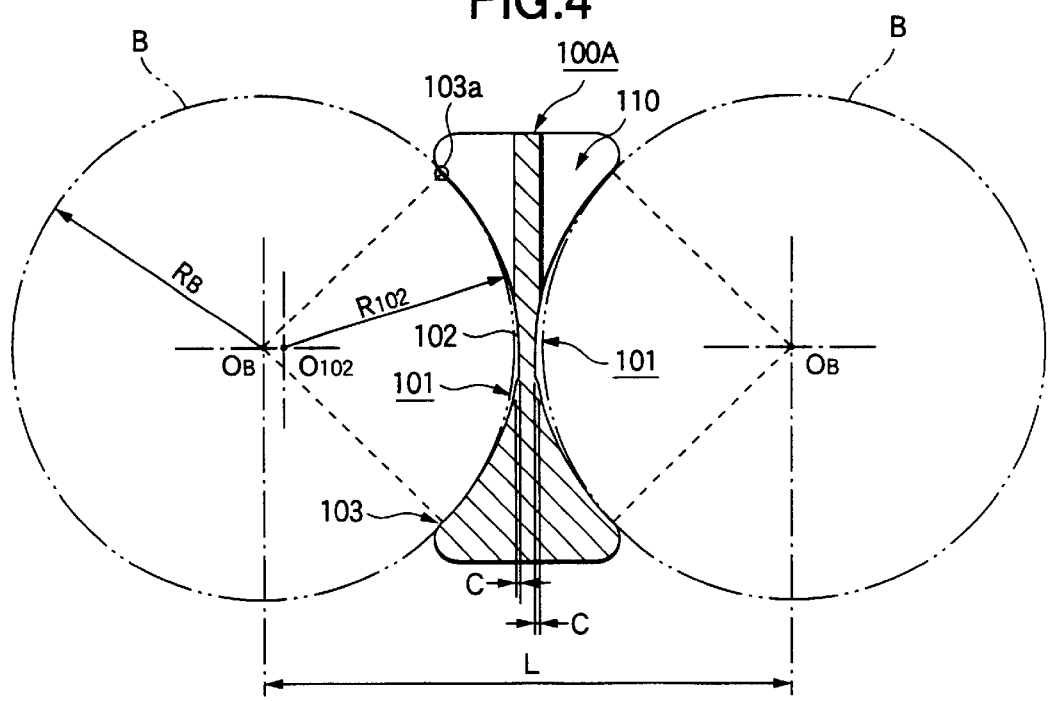
FIG. 4 is a cross sectional view taken line IV—IV in FIG. 3.

FIGS. 3 and 4 show a second embodiment of a retaining piece structure according to the present invention. The retaining piece 100A of this embodiment is different from that of the first embodiment in that slit portions 110 are formed in the concave surface 101 thereof. Since the slit portions 110 serve as lubricant reservoirs. Accordingly, the operability and the durability will be improved. Foreign matters also move into and are stored in the slit portions 110, so that the retaining piece 100A is less worn. For this reason, in particular under hard circumstances where foreign matters and the like are present, the durability in the second embodiment is superior to that of the first embodiment.

The other construction, operation and effects of the second embodiment are substantially the same as those of the first embodiment.

FIGS. 5 and 6 show a third embodiment of a retaining piece structure according to the present invention.

The retaining piece 100B of this embodiment is different from those retaining pieces of the first and second embodiments in that a through hole 120, which axially extends, is provided at the ventral portion of the concave surface 101. The through hole 120 serves as a lubricant reservoir, so that the operability and the durability will be both improved. Foreign matters also move to and put into the through hole 120. As a result, the wearing of the retaining piece 100A is lessened. In particular under hard use circumstances where foreign matters and the like are present, this embodiment is superior in durability to the first embodiment. The other construction, operation and effects of this embodiment are similar to those of the first embodiment.

Figure 7:
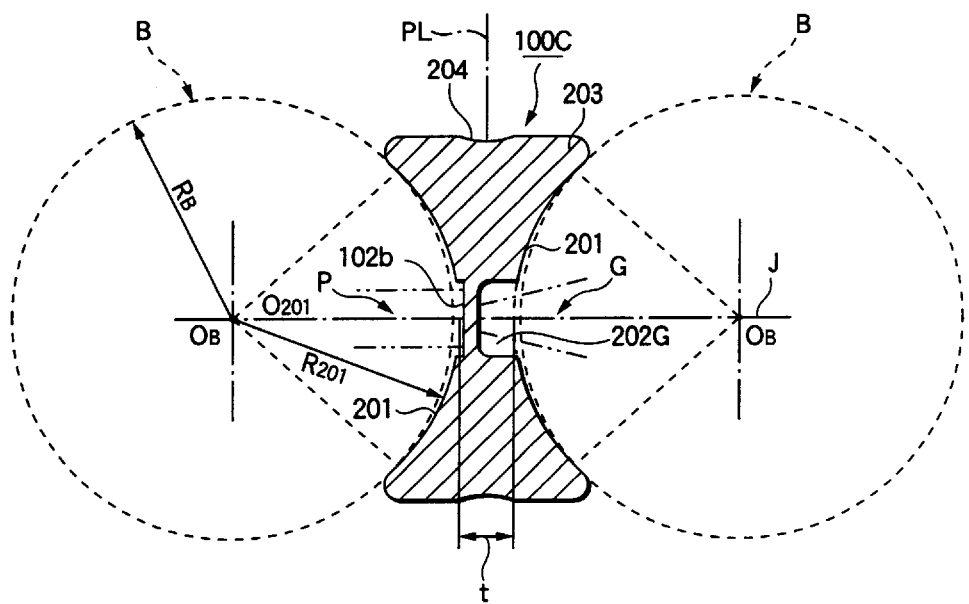
FIG. 7 is a cross sectional view showing a retaining piece structure which is a fourth embodiment of the present invention.
Figure 8:
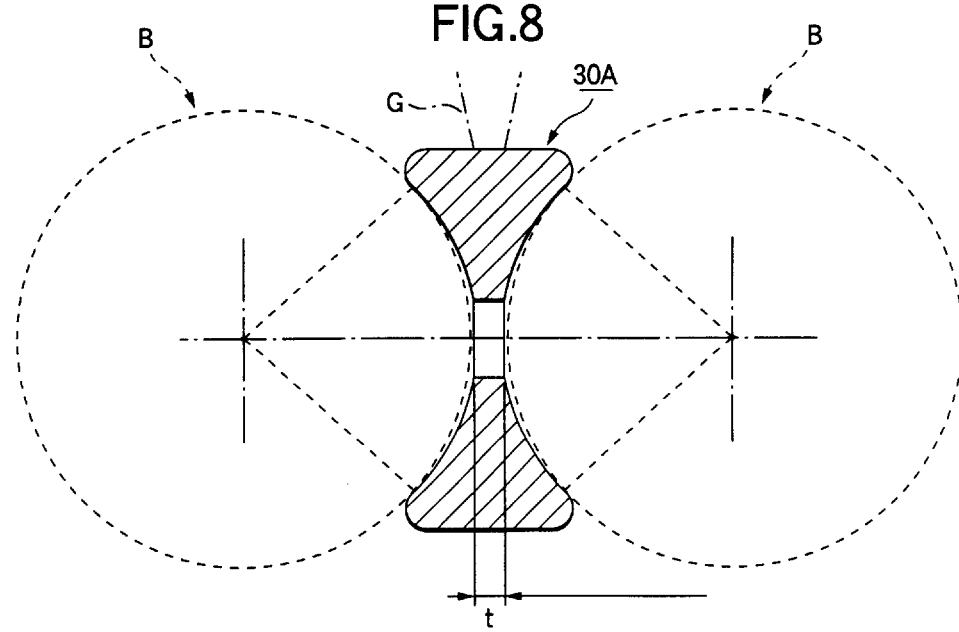
FIG. 8 is a cross sectional view showing a retaining piece structure related to the invention.

FIG. 7 shows a fourth embodiment of a retaining piece structure according to the present invention.

In the retaining piece 100C of this embodiment, the retaining piece 100C is made of a material excellent in the injection molding, wear proof, rigidity and the like, such as 66 nylon or whiskers-contained 66 nylon. It takes the form of a short cylindrical member smaller in diameter than the steel ball B. If known lubricant is contained in the material, the operability and durability are both improved. Both sides of the short cylindrical member are inward curved at the radius of curvature, which is approximate to the radius RB of the steel ball B, into concave surfaces 201. The details of the concave surfaces 201 will be described hereunder. The curvature center $O_{102}$ and $O_{201}$ of the concave surfaces 201 lie on an axial line J. Accordingly, the thickness of the retaining piece, which is located between one concave surfaces 201, is minimum in value at the bottom positions or the concave surfaces through which the axial line J passes.

A relatively shallow recess 202p is formed in the bottom portion of one of the concave surfaces 201, while a relatively deep recess 202G is formed in the bottom portion of the other concave surface 201. The shallow recess 202p serves as a portion to which a ejector pin P (indicated by a phantom line in FIG. 7) of a mold in the process of injection molding the retaining piece 100C, viz., a pin joining portion. The deep recess 202G is a joining portion for a gate G (indicated by a phantom line in FIG. 7) of a mold in the process of injection molding the retaining piece 100C. The above-mentioned thickness "t" of the retaining piece 100C is selected to be such a thickness as to allow the formation of the shallow recess 102p and the deep recess 202G. Therefore, the load capacity and rigidity of the linear motion device which are as high in level as possible, are secured.

In the embodiment, a parting line PL is provided on an outer peripheral surface 203 as the outer peripheral surface of the cylindrical member. A recess (or may be a tapered portion) 204 is provided also near and along the parting line PL, while entirely surrounding the outer peripheral surface 203.

The operation of the retaining piece 100C will be described.

In the case of the retaining piece 100C, the portions to be joined to the ejector pin P and the gate G in molding process are the bottom surfaces of the shallow recess 202p and the deep recess 202G. Therefore, in separating the product from the mold, the retaining piece 100C is automatically separated from the gate G. Accordingly, the gate cutting process, which is essential to the conventional technique, is eliminated, and this leads to cost reduction.

The portion to be butted with the ejector pin P for ejecting the product out of the mold, and gate remainder after the gate port is cut out, viz., called fins, are put in the shallow recess 202p and the deep recess 202G. Therefore, there is no case that those fins are protruded as obstacle things from the concave surfaces 201. Accordingly, it never happens that when the retaining pieces 100C are incorporated into the linear motion device, such as a linear guide or a ball screw mechanism, the fins or the like come in contact with the balls in the linear motion device, the inside guide members (e.g., the return guide and the slider) and the outside guide members (e.g., the end caps and the guide rail) of the ball circulation track, to thereby deteriorate the operability and the noise characteristic.

In the retaining piece 100C, the recess 204 is provided near the parting line PL set on the outer peripheral surface 203. Therefore, protrusion of the parting line PL formed in the molding process is put into the recess 204, and is not protruded outside. In this respect, the invention succeeds in solving the problem of the conventional technique that when the retaining piece 100C is incorporated into the linear motion device, the protrusion of the parting line comes in contact with the inside and outside guide members of the linear motion device to deteriorate the operability and the noise characteristic.

Thus, the invention provides a retaining piece structure which is low in noise and high in operability, and minimizes the reduction of the load capacity and rigidity. The other construction, operation and effects of this embodiment are similar to those of the first embodiment.

The linear motion device using the retaining piece structure of the invention is not limited to the linear guide, but may be applied to other linear motion devices, such as a ball screw mechanism. In short, the invention may be applied to a device for causing a linear motion by the utilization of rolling of the row of rolling elements. By so doing, the improvement of the operability and the noise characteristic is obtained.

While the retaining pieces used in the above-mentioned embodiments are separated from one another, it is readily understood that those remaining pieces coupled to one another be used.

The invention has the following has the effects by the structure. As seen from the foregoing description, as the load acting on the concave surfaces or the retaining pieces each being interposed between the adjacent rolling pieces increases, or as the wearing and yielding of the concave surface of each retaining piece progress, the contact areas of the retaining piece to the rolling elements are increased, thereby reducing a variation of the element-to-element span. Therefore, the present invention is capable of maintaining good operability and good noise characteristic of the linear motion device for a long time even under various use conditions.

In addition, as seen from the foregoing description, the thickness of the retaining piece interposed between the rolling elements is minimized, and the recesses are formed in the concave surfaces of the retaining piece, which are to be in contact with the balls, and/or the outer peripheral surface thereof. Therefore, there is no case where the operability and the noise characteristic are deteriorated by harmful fins. Accordingly, the operability and the noise characteristic of the linear motion device are improved, and the reduction of the load capacity and rigidity is lessened.

Further, when each structure of the above-mentioned embodiments are used together, the operability and the noise characteristic of the linear motion device are remarkably improved, and reduction of the load capacity and rigidity is also lessened.

What is claimed is:

1. A structure of a retaining piece which is interposed between each two adjacent rolling elements in a row, the structure comprising concave surfaces at both side surfaces of said retaining piece in an axial direction of said row, each of said concave surfaces being in contact with a spherical surface of an adjacent rolling element, wherein each of said concave surfaces includes:

a linear contact portion to be in contact with said adjacent rolling element, which is located in the vicinity of an outer peripheral edge thereof; and a curved surface having a radius of curvature approximate to that of said adjacent rolling element, which is located on an inner side of said linear contact portion.

2. A linear motion device comprising the retaining piece according to claim 1.

* * * * *